Patented Aug. 8, 1939

2,168,848

UNITED STATES PATENT OFFICE 2,168,848

EXTREME PRESSURE LUBRICANT

Anderson W. Ralston, Chicago, Ill., assignor to Armour and Company, Chicago, Ill., a corporation of Illinois No Drawing. Application July 29, 1936, Serial No. 93,313

16 Claims. (Cl. 87—9)

This invention relates to extreme pressure lubricants and it comprises lubricants composed of a lubricating agent to which has been added an aliphatic thioamide to impart extreme pressure lubrication characteristics to the lubricating agent.

Within recent years many different types of adjuncts have been added to lubricating oils and greases to impart properties thereto not ordinarily possessed by such materials, or to improve certain characteristics of the lubricating oil or grease. For example, various substances have been added to improve that characteristic in a lubricant commonly referred to as oiliness. In other instances antioxidants are added to inhibit the oxidation of the lubricant.

Still more recently substances have been added to lubricants to improve the lubricating effect thereof at high temperatures and pressures. The tendency in modern machine design is to develop devices which operate under high bearing pressures. Many lubricants, such as ordinary petroleum lubricating oils, are not satisfactory over periods of time because the lubricant does not prevent the welding action of the metal bearings at high temperatures and pressures. This results in seizure of the bearing. The action is not to be confused with mere break-down of a lubricating film. The film strength of a lubricant can be improved by adding materials thereto which aid in the formation of a strong oil film, possibly adsorbed by the metal bearing surface. But a substance which will aid in film formation, and hence improve oiliness, will not necessarily continue to function at the extreme high pressures imposed on many bearings. Many substances will aid the oil in overcoming friction but will not prevent bearing seizure at high bearing pressures and temperatures.

Consequently, the art has sought substances which could be added to lubricating oils and greases which would prevent bearing seizure or the welding action of the bearing metals at high temperatures and pressures. Oils and greases to which such substances have been added are referred to as extreme pressure lubricants. That is to say, they are lubricants which can be used to lubricate bearings in machines which operate at high temperatures and high bearing pressures. In many instances the added ingredient does not increase the oiliness at all, or only to a slight extent. But it does function to prevent bearing seizure at high bearing pressures.

Such substances however must have physical and chemical properties which fit them for use in this art. This means that they must be heat stable at relatively high temperatures and they must be chemically stable and resistant to decomposition in the presence of moisture. Likewise, as a corallary thereof, they must not be corrosive to metals. These additional requirements make it difficult to find satisfactory substances. Moreover, in the present state of our knowledge, it is not possible to predict whether some selected substance will function in extreme pressure lubrication. This is because, at the present time, the art does not know how these materials actually worked in the lubricating oil or grease. Physical properties alone, such as melting point, offer no guide-posts to the proper selection of an extreme pressure addition agent.

For testing extreme pressure lubricants a number of machines have been devised. Most of them apply a measurable pressure upon a pin which rotates between two metal blocks. The pin is lubricated by the lubricant to be tested and means are provided to heat the oil and to gradually increase the pressure upon the pin. As the pressure is increased the pin gradually begins to seize the metal blocks and a point is reached where the pin actually breaks. Generally the test is not prolonged to the breaking point of the pin. The metal blocks are made of metal harder than the pin and any metal seizure or actual welding of the pin to the blocks is shown by a loss in weight of the pin. In other words, the blocks tend to tear metal away from the pin and this can only happen when the pin and blocks begin to weld together. One such machine is known in the art as a Faville-LaVally and my extreme pressure lubricants have been tested in such a machine. Ordinary lubricants will withstand pressures up to 600 or 850 pounds upon the pin. Extreme pressure lubricants should stand pressures up to 4000 to 4500 pounds before shearing or loss of pin metal is noticed.

I have now discovered a class of compounds which will function to impart extreme pressure characteristics to ordinary lubricating oils and greases. The substances which I add to such lubricating materials can be generically designated as aliphatic thioamides. These compounds have the general structure formula $RCSNH_2$ wherein R is an alkyl group. Ways of preparing these compounds are known to the art but many of the thioamides which I use are, I believe, new compounds and have been disclosed in my copending application, Serial Number 89,951, filed July 9, 1936. That application describes ways of making thioamides in which the alkyl group contains ten or more carbon atoms and these higher alkyl thioamides are especially suitable for use in my invention. The process described in that application consists in reacting a nitrile, such as heptadecyl nitrile, with sulfur, ammonia and hydrogen sulfide whereby the nitrile is converted to heptadecyl thioamide. Other ways of preparing the thioamides can, of course, be used in the practice of the present invention.

Broadly then, my invention comprises a lubricant, such as a petroleum hydrocarbon lubricating oil or grease, to which has been added an amount, usually small, of an aliphatic thioamide in which the alkyl group thereof contains usually six or more carbon atoms. For example, hexyl thiamide is ordinarily the lowest molecular weight thioamide which I use but I do not wish to be restricted thereto since others are effective. Apparently the degree of effectiveness increases as the molecular weight of the thioamide increases. In other words, the effectiveness increases as the number of carbon atoms in the alkyl group of the thioamide increases. For this reason I ordinarily find it best to use thioamides in which the alkyl group has ten or more carbon atoms. Thus, I can use undecyl thioamide, tridecyl, pentadecyl and heptadecyl. I can also use various mixtures of thioamides and one of the best is a mixture prepared by converting a mixture of palmito and stearonitriles to their corresponding thioamides. But since I am the first to incorporate thioamides in lubricants for the purpose stated I wish to claim my invention broadly.

In addition to their effectiveness for the purpose stated, the thioamides are heat stable at the high bearing temperatures. They do not hydrolyze or decompose, and they do not corrode the bearing metal.

The quantity of thioamide to be added can vary over wide limits. Generally the amount used is correlated to the purpose for which the lubricant is to be used. If the lubricant must meet a pressure of only 2000 pounds then I need not add as much alkyl thioamide as when the lubricant must operate under pressures of 4500 pounds. Likewise the higher alkyl thioamides are more effective, in like quantities at higher pressures, than the thioamides containing only six or eight carbon atoms in the alkyl group. For most purposes however, heptadecyl thioamide is the best to use since it is quite inexpensive and can be used in lubricants for extreme pressure lubrication under all conditions. Because it is prepared readily and at low expense relatively large quantities of it can be used and this means that I can prepare an all-purpose extreme pressure lubricant without taking any particular precautions to restrict the amount of thioamide for reasons of economy.

The lubricant to which the thioamide is added can also be chosen from any of the materials now used for the lubrication of bearings. Thus the lubricant can be an ordinary petroleum base lubricant of any viscosity. Naturally I choose the lubricant to fit the type of bearing and conditions under which it must be lubricated. This procedure is, of course, customary. Then, to such a lubricant, I incorporate enough thioamide to impart the required degree of extreme pressure characteristic. Accordingly, the base lubricant can be any of the usual petroleum lubricating oils and greases. The base lubricant can also be non-petroleum lubricants such as castor oil and similar fatty oils used in lubrication. Or the base lubricant can be an aralkyl ketone having lubricating properties, or mixtures thereof with petroleum lubricants. Such ketone lubricants are described and claimed in the copending application of Ralston and Conquest, Serial Number 86,887 filed June 23, 1936.

I shall now give examples of my extreme pressure lubricant. I add six parts by weight of heptadecyl thioamide to 100 parts by weight of a lubricating oil known as Pennsylvania Bright stock. This oil prior to addition of the thioamide, carries a load of only 800 pounds as tested in the Faville-LaVally machine. The oil after addition of the thioamide will sustain a load of 4500 pounds without showing signs of seizure or wear.

Similar improvement is observed when the thioamide is tridecyl, but with undecyl thioamide the load sustained is somewhat less but yet much greater than that which the untreated oil will carry. The quantity of heptadecyl thioamide can be decreased to 3 or 4 parts to 100 parts of oil without loss of extreme pressure characteristics.

In another example I add 2 parts of heptadecyl thioamide to 100 parts of isomeric xylylheptadecyl ketones. These ketones are liquid and can be made from xylene and stearyl chloride. Prior to addition of the thioamide the ketone carries a load of only 900 pounds. After incorporation of the thioamide the load can be increased to 1700 pounds before seizure. When the amount of heytadecyl thioamide is increased to 6 parts to 100 parts of ketones the load carried increases to 4500 pounds. This will illustrate the effect of increasing the quantity of thioamide, other factors remaining constant.

Other ketones can, of course, be improved and the copending application referred to above lists many aralkyl ketones which can be used as lubricants. All of these ketones have the generic structure R—CO—R', wherein R is an aryl group such as phenyl, naphthyl, anthracyl, substituted phenyls, etc., and R' is an alkyl radical containing ten or more carbon atoms.

The quantity of thioamide can be increased markedly above the six percent given in the foregoing examples but to no substantial advantage. Thus for example I can add as much as 20 or 25 percent of heptadecyl thioamide.

In like manner the thioamides can be incorporated in lubricating greases in amounts ranging from 2 to 20 percent. Larger quantities are permissible but for reasons of economy it is better to keep within the proportions stated. However, when the lubricant is intended to be used under bearing loads up to as much as 10,000 pounds then it is advantageous to increase the amount of thioamide.

Having thus described my invention, what I claim is:

1. A lubricant especially adapted for extreme pressure lubrication comprising a lubricant and an alkylthioamide having at least 6 carbon atoms in the alkyl radical.

2. A lubricant especially adapted for extreme pressure lubrication comprising a lubricant and an alkylthioamide having at least ten carbon atoms in the alkyl radical.

3. A lubricant especially adapted for extreme pressure lubrication comprising a lubricant and heptadecylthioamide.

4. A lubricant especially adapted for extreme pressure lubrication including an alkylthioamide having at least 6 carbon atoms in the alkyl radical.

5. A lubricant especially adapted for extreme pressure lubrication including an alkylthioamide having at least ten carbon atoms in the alkyl radical.

6. A lubricant especially adapted for extreme pressure lubrication including heptadecylthioamide.

7. A lubricant composition comprising a hydrocarbon lubricant and an alkyl-thioamide having at least 6 carbon atoms in the alkyl radical.

8. A lubricant composition comprising a hydrocarbon lubricant and an alkyl-thioamide having at least ten carbon atoms in the alkyl radical.

9. A lubricant composition comprising a hydrocarbon lubricant and heptadecylthioamide.

10. A lubricant comprising an aralkyl ketone having lubricant properties and an alkylthioamide having at least 6 carbon atoms in the alkyl radical.

11. A lubricant comprising an aralkyl ketone having lubricant properties and an alkylthioamide having at least ten carbon atoms in the alkyl radical.

12. A lubricant comprising an aralkyl ketone having lubricant properties and heptadecylthioamide.

13. A lubricant comprising a xylyl-alkyl ketone having lubricant properties and heptadecyl thioamide.

14. The process of imparting extreme pressure lubrication characteristics to lubricants which comprises admixing therewith an alkylthioamide having at least 6 carbon atoms in the alkyl radical.

15. The process of imparting extreme pressure lubrication characteristics to lubricants which comprises admixing therewith an alkylthioamide in which the alkyl radical contains at least ten carbon atoms.

16. The process as in claim 15 wherein the amide is heptadecylthioamide.

ANDERSON W. RALSTON.